(12) United States Patent
Hensel et al.

(10) Patent No.: US 10,609,934 B2
(45) Date of Patent: Apr. 7, 2020

(54) SUCTION TOOL AND DEVICE AND METHOD FOR GUTTING FISH OPENED AT THE ABDOMINAL CAVITY

(71) Applicant: NORDISCHER MASCHINENBAU RUD. BAADER GMBH + CO. KG, Luebeck (DE)

(72) Inventors: Rene Lukas Hensel, Klempau (DE); Carsten Paulsohn, Luebeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/096,041

(22) PCT Filed: Apr. 26, 2016

(86) PCT No.: PCT/EP2016/059260
§ 371 (c)(1),
(2) Date: Oct. 24, 2018

(87) PCT Pub. No.: WO2017/186270
PCT Pub. Date: Nov. 2, 2017

(65) Prior Publication Data
US 2019/0133142 A1 May 9, 2019

(51) Int. Cl.
*A22C 25/00* (2006.01)
*A22C 25/14* (2006.01)

(52) U.S. Cl.
CPC .................................. *A22C 25/147* (2013.01)

(58) Field of Classification Search
CPC ........ A22C 25/00; A22C 25/14; A22C 25/145; A22C 25/147
(Continued)

(56) References Cited

U.S. PATENT DOCUMENTS 3,921,255 A 11/1975 Labarber
4,114,239 A 9/1978 McClelland
(Continued)

OTHER PUBLICATIONS

PCT Search Report and Written Opinion issued in PCT/EP2016/059260.
Office Action issued in Chilean Application No. 2018003034.

*Primary Examiner* — Richard T Price, Jr.
(74) *Attorney, Agent, or Firm* — Greenblum & Bernstein, P.L.C.

(57) ABSTRACT

The invention relates to a suction tool (10), configured and adapted for gutting fish (11) opened at the abdominal cavity, comprising a suction pipe (13) forming a main channel (12), wherein the suction pipe (13) has a connection (14) for a vacuum unit (15) at a free end and a suction opening (16) at the opposing end facing the abdominal cavity in the operating state, wherein the suction opening (16) laterally passes out of the suction pipe (13) and is thereby oriented radially in relation to the central axis M of the suction pipe (13), characterized in that an additional pipe element (23) for forming an auxiliary air channel (24, 31) is arranged in the region of the suction opening (16) of the suction pipe (13), wherein the pipe element (23) is arranged and adapted in such a way that a continuous suction air volume flow is maintained in the operating state of the suction tool (10). The invention also relates to an apparatus (17) and a method for gutting fish (11) opened at the abdominal cavity.

23 Claims, 5 Drawing Sheets

(58) Field of Classification Search
USPC .......................... 452/106, 107, 116, 120, 121
See application file for complete search history.

(56) References Cited

U.S. PATENT DOCUMENTS

| | | | | |
|---|---|---|---|---|
| 5,980,376 | A * | 11/1999 | Grosseholz | A22C 25/147 |
| | | | | 452/116 |
| 7,166,022 | B2 * | 1/2007 | Soerensen | A22B 5/0082 |
| | | | | 452/123 |
| 7,179,163 | B1 * | 2/2007 | Vedsted | A22C 25/14 |
| | | | | 452/121 |
| 7,427,229 | B2 * | 9/2008 | Grosseholz | A22C 25/147 |
| | | | | 452/106 |
| 7,559,830 | B2 * | 7/2009 | Solberg | A22C 25/145 |
| | | | | 452/121 |
| 7,828,635 | B2 | 11/2010 | Paulsohn | |
| 8,118,647 | B2 * | 2/2012 | Mikajiri | A22C 25/14 |
| | | | | 452/149 |
| 8,512,106 | B2 * | 8/2013 | Ryan | A22C 25/147 |
| | | | | 452/121 |
| 8,986,077 | B1 | 3/2015 | Ryan | |
| 2004/0203331 | A1 | 10/2004 | Grobeholz | |
| 2009/0233534 | A1 | 9/2009 | Paulsohn | |
| 2016/0000051 | A1 | 1/2016 | Goodrick | |
| 2019/0116817 | A1 | 4/2019 | Herbst | |
| 2019/0133141 | A1 | 5/2019 | Schubert | |
| 2019/0133142 | A1 | 5/2019 | Hensel | |
| 2019/0136942 | A1 | 5/2019 | Dalgaard-Nielsen | |

* cited by examiner

SUCTION TOOL AND DEVICE AND METHOD FOR GUTTING FISH OPENED AT THE ABDOMINAL CAVITY

CROSS-REFERENCE TO RELATED APPLICATIONS

The instant application is a US National stage of PCT International Application No. PCT/EP2016/059260 filed Apr. 26, 2016.

BACKGROUND OF THE INVENTION

1. Field of the Invention

The invention relates to a suction tool, configured and adapted for gutting fish opened at the abdominal cavity, comprising a suction pipe forming a main channel, wherein the suction pipe has a connection for a vacuum unit at a free end and a suction opening at the opposing end facing the abdominal cavity in the operating state, wherein the suction opening laterally passes out of the suction pipe and is thereby oriented radially in relation to the central axis of the suction pipe.

2. Discussion of Background Information

The invention further relates to an apparatus, configured and adapted for gutting fish opened at the abdominal cavity, comprising a transport conveyor with at least one receptacle for receiving fish lying on their backs and for transporting said fish tail-first in transport direction T, at least one suction tool for sucking out the internal organs which is movable out of a standby position outside the abdominal cavity into a working position inside the abdominal cavity and back, at least one vacuum unit to which the suction tool is connected, at least one measuring device which is configured in such a way as to detect specific fish data, and at least one control unit for controlling the or each suction tool dependent on the specific fish data detected by the measuring device.

The invention also relates to a method for gutting fish opened at the abdominal cavity, comprising the steps: Transporting fish lying on their backs tail-first in transport direction T by way of a transport conveyor, detecting specific fish data by way of a measuring device, dipping a suction tool for sucking out the internal organs into the opened abdominal cavity, controlling the suction tool to a defined position inside the abdominal cavity by way of a control unit which is in operative connection with the measuring device and the suction tool, generating a relative movement between the fish and the suction tool, and sucking out the internal organs through a main channel of the suction tool connected to a vacuum unit.

Such suction tools as well as apparatuses and methods are used when slaughtering or gutting fish, particularly of the Salmo species. The suction tools and apparatuses enable automated gutting of the fish. For this purpose, the abdominal cavity of the fish is opened centrally with a knife or the like and the internal organs, blood vessels, membranes and other viscera are removed by suction by way of a processing station comprising at least one suction element. Gutting of the fish can also be described as cleaning. As mentioned, the processing station comprises at least one suction element. Usually, however, the processing station comprises at least three gutting tools designed as suction elements, the tool heads of which are formed by scrapers and/or raspers and/or knives with suction nozzles. The gutting tools arranged one after another along a transport path of the fish usually have different functions. One of the gutting tools, usually the third gutting tool in transport direction T of the fish, is designed and configured as a suction tool for gutting the fish, namely in particular for removing the blood vessels.

So that gutting and in particular removal of the blood vessels can be carried out as efficiently and carefully as possible, the known suction pipe of the suction tool has a deflection of approximately 90° at one free end such that the main channel bends at least in the region of the free end, which is in the abdominal cavity in the operating state, and thus the suction opening of the main channel is oriented contrary to the transport direction T of the fish. In the operating state means that the suction tool with the suction pipe is positioned approximately perpendicular or slightly inclined in the abdominal cavity, wherein the suction pipe is connected at the one free end to the vacuum unit, and pointing with the other free end, namely with the aperture area of the suction opening, towards the collar bones opposite to the transport direction T of the fish. By operating the vacuum unit, the negative pressure in the suction pipe creates a suction air volume flow with which the internal organs and in particular the blood vessels and blood residues are sucked upwards out of the abdominal cavity through the main channel of the suction pipe. In this case, the suction air volume flow has a speed greater than zero. A drop in the speed of the suction air volume flow to zero is identical to a suction capacity equal to zero. In other words, the abdominal cavity cannot be sucked empty or material located in the suction pipe can flow back into the abdominal cavity again due to gravity.

A drop in the speed to zero can occur if the main channel and therefore the suction opening are closed. Closing can take place deliberately and therefore controlled, e.g. by closing the main channel with a closing mechanism. But closing can also take place unintentionally and therefore uncontrolled, for example if the suction opening of the main channel becomes clogged during the sucking out process. In the event that, for example, viscera or the like accumulate and partially or completely close the suction opening, the speed of the suction air volume flow drops, possibly even to zero, such that the suction air volume flow is interrupted and prevents further cleaning of the abdominal cavity.

The abdominal cavity of a fish to be processed is limited towards the head by the collar bone which prevents the suction tool from advancing further. In other words, to prevent a collision of the continuously conveyed fish in the region of the collar bone, the suction tool must be brought out of the abdominal cavity in good time. However, in order to achieve the best possible cleaning result, it is necessary on the other hand to bring the suction tool as close to the collar bone as possible. The head membrane of the fish is also located in the region of the collar bone. If the suction tool is too close to the collar bone, the head membrane may also seal off the suction opening which leads to a drop in, up to a failure of, the suction air volume flow.

A further problem is that, due to the curved shape of the suction pipe with the suction opening directed towards the collar bone, the tool is prevented by said collar bone from advancing into the region below the collar bone. Simply put, the suction pipe with the suction opening extends obtusely towards the collar bone. However, blood residues from the blood vessels are located and accumulate specifically in the head region. These blood residues accumulate in particular in the region of the collar bone in a cavity which also extends underneath the collar bone towards the head such that the blood vessels and corresponding blood residues located in the cavity below the collar bone cannot be removed or can only be removed inadequately with the known suction tool.

SUMMARY OF THE INVENTION

The object of the invention is therefore to create a simple suction tool by way of which cleaning of the abdominal cavity can be effectively improved. The object further consists of proposing a corresponding apparatus and a corresponding method for gutting fish opened at the abdominal cavity.

This object is achieved in conjunction with the features of the suction tool referred to hereinbefore in that an additional pipe element for forming an auxiliary air channel is arranged in the region of the suction opening of the suction pipe, the pipe element being arranged and configured in such a way that a continuous suction air volume flow is maintained in the operating state of the suction tool. The auxiliary air channel ensures in all operating states that a suction air volume flow is maintained even if the suction opening of the main channel is partially or completely closed by internal organs. Even if the head membrane seals the suction opening of the main channel, the pipe element, which ensures the provision of auxiliary air, prevents the suction air volume flow from dropping to zero in the aperture area of the suction pipe. Thus a suction capacity can be maintained which more effectively sucks out the abdominal cavity and/or at least prevents the backflow of internal organs located in the suction pipe. The provision of auxiliary air includes both supplying and discharging air. When supplying air, in particular by providing ambient air at atmospheric pressure via the auxiliary air channel of the pipe element, it is ensured that the main channel can still draw in (auxiliary) air in order to maintain a suction air volume flow even when the suction opening is closed. When discharging air, in particular by extracting (auxiliary) air through the auxiliary air channel of the pipe element, it is possible to maintain a suction air volume flow through the auxiliary channel even when the suction opening of the main channel is closed. In all cases, the cleaning result of the suction tool is improved by the embodiment according to the invention.

An especially preferred development is characterised in that one end of the pipe element is located in the operating area of the suction opening of the main channel of the suction pipe and the other end of the pipe element is located outside the operating area of the suction opening of the main channel of the suction pipe. This achieves a particularly effective provision of auxiliary air. The operating area of the suction opening describes the area in which the suction air volume flow of the main channel achieves a suction effect. In addition to the suction opening cross-section, this area also includes adjacent areas of the suction opening cross-section as well as areas immediately in front of and immediately behind the edge of the main channel forming and surrounding the suction opening. The end of the pipe element which is located outside the operating area of the suction opening is neither immediately exposed to the suction air volume flow of the main channel, nor is it exposed to direct contact with the internal organs. This embodiment according to the invention ensures that at least the end of the pipe element outside the operating area of the suction opening is protected vis-à-vis obstruction by viscera, sealing by a membrane or the like so that it is possible to reliably provide auxiliary air at the end of the pipe element which is located in the operating area of the suction opening in order to improve the cleaning process.

A closing mechanism for closing the main channel is advantageously assigned to the suction pipe. Thus the suction pipe, or more precisely the main channel, can be completely or partially closed and re-opened deliberately and therefore in a controlled manner. It is possible to regulate the suction air volume flow to improve the cleaning result by changing the cross-section to the point of completely closing and fully opening the main channel and thus the suction opening.

The closing mechanism expediently comprises at least one slide element for closing the suction opening and a pneumatic cylinder for actuating the slide element. This realises a very easy and reliable way of controlling the suction air volume flow to optimise the cleaning result.

In a first especially preferred embodiment, the pipe element is designed as a passive auxiliary air channel which connects the aperture area of the suction opening to the atmospheric environment of the suction pipe in the operating state. Passive is used to describe an auxiliary air channel in which the auxiliary air is neither specifically supplied to nor discharged from the pipe element by a pump or the like or by a vacuum unit or the like. In this solution, there are no dedicated devices using which the auxiliary air is provided via the pipe element. The simple connection of the aperture area of the suction opening to the environment ensures in a particularly simple and effective way that the suction air volume flow in the main channel can still draw in (auxiliary) air even when the suction opening is closed in order to maintain a suction capacity. Thus, the cleaning process can be effectively improved.

A preferred development of this embodiment provides that the pipe element comprises a curved pipe segment whose one free end with an opening is directed vertically downwards parallel to the central axis of the suction pipe and in the aperture area of the suction opening protrudes into the main channel, and whose other free end with an opening protrudes from the main channel, wherein said opening located outside the suction pipe points in the opposite direction in relation to the suction opening. As the pipe element or auxiliary air channel is in operative connection with the vacuum unit via the main channel in the operating state of the suction tool, the positioning and orientation of the opening located outside the suction pipe in transport direction T of the fish leads to constantly free access of auxiliary air. In other words, continuous and blockage-free sucking in of auxiliary air is ensured, said air leading through the opening directed vertically downwards towards the blood vessels in the aperture area of the suction opening for maintaining a suction air volume flow within the main channel.

Another especially preferred embodiment is characterised in that the pipe element is designed as an active auxiliary air channel which connects the aperture area of the suction opening to a vacuum unit in the operating state. Active is used to describe an auxiliary air channel in which the auxiliary air is specifically supplied to or discharged from the pipe element by a pump or the like or by a vacuum unit or the like. Thus, in this solution there are dedicated devices using which auxiliary air can be supplied as compressed air or can be discharged as suction air. This embodiment according to the invention not only enables the maintenance of the suction air volume flow in the main channel but also the provision of an additional suction air volume flow through the auxiliary air channel which increases the cleaning performance.

The pipe element preferably comprises a pipe segment whose one free end with an opening in the aperture area is oriented radially in relation to the central axis of the suction pipe corresponding to and in alignment with the suction opening of the suction pipe, and whose other free end with an opening can be connected by way of a suction tube to a vacuum unit. In addition to the main cross-section defined by the suction opening for sucking out the internal organs, an auxiliary cross-section is also defined by the additional opening in the aperture area of the suction opening. The auxiliary cross-section can be located within the main cross-section or at least partially outside the main cross-section. In all cases, the auxiliary cross-section provides a supplementary suction air volume flow in order to improve the cleaning result.

Especially preferably, the pipe element in the aperture area protrudes from the suction pipe with the free end. This means that the pipe element protrudes from the suction opening of the suction pipe opposite to the transport direction T of the fish. The opening or the plane $E_O$ defined/spanned by the opening sits in front of the suction opening or the plane $E_S$ defined/spanned by the suction opening in transport direction T of the fish. With this especially preferred embodiment, in addition to the provision of additional suction air as auxiliary air, it is further achieved that the pipe element serves as a spacer for the suction opening in that the pipe element due to the projection prevents viscera and in particular the head membrane from lying in front of the suction opening in a sealing manner. As a result, air can be drawn continuously through the suction opening of the main channel to maintain the suction air volume flow. In addition, due to the projection the protruding pipe element penetrates deeper into the cavity underneath the collar bone so that the blood vessels extending up into the head area and blood accumulating in the cavity can be sucked out better and more effectively.

Advantageously, the opening of the pipe element located in the aperture area of the suction pipe is arranged on the lower edge of the suction opening of the suction pipe in the operating state. Thus, the advantages described above are further supported and even reinforced.

The object is also achieved by an apparatus having the features referred to hereinbefore in that the suction tool is configured according to one or more aspects of the invention.

At least two separate vacuum units are preferably provided, in such a way that the suction pipe is connected to a first vacuum unit and the pipe element to a second vacuum unit. The main channel and the auxiliary air channel can therefore generate and maintain a suction air volume flow independently of each other.

The advantages arising from this have already been described in connection with the suction tool, which is why reference will be made to the relevant passages to avoid repetitions.

The object is also achieved by a method having the steps referred to hereinbefore, which is characterised in that auxiliary air is provided to the main channel by way of an auxiliary air channel when sucking out the internal organs, such that a continuous suction air volume flow is maintained.

In a first especially preferred procedure, the auxiliary air is provided to the main channel passively as ambient air at atmospheric pressure via a pipe element and the auxiliary air is sucked in through the main channel in the aperture area of the suction pipe.

In a further especially preferred procedure, the auxiliary air is provided to the main channel actively as suction air at negative pressure via a pipe element so that a suction air volume flow is generated via the auxiliary air channel in addition to the suction air volume flow via the main channel.

The advantages arising from this have already been described in connection with the suction tool, which is why reference will be made to the relevant passages to avoid repetitions.

BRIEF DESCRIPTION OF THE DRAWINGS

Further expedient and/or advantageous features and developments as well as process steps emerge from the claims and the description. Especially preferred embodiments of the suction tool as well as the apparatus and the method are explained in greater detail with reference to the attached drawing. The drawing shows:

DETAILED DESCRIPTION OF THE INVENTION

Figure 1:
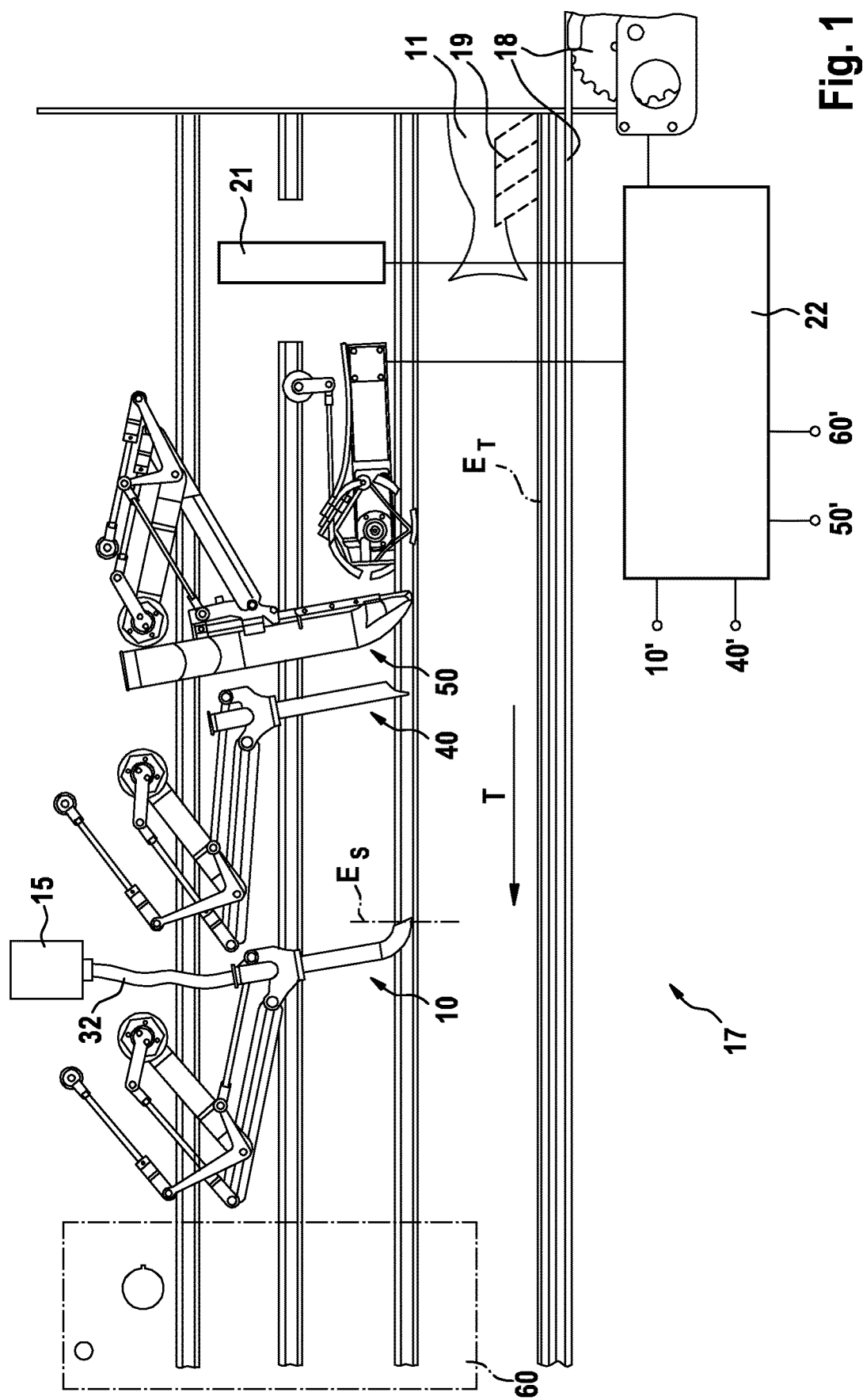
FIG. 1 a schematic illustration of an apparatus for gutting fish opened at the abdominal cavity with a processing station comprising three gutting tools, FIG. 2 a first embodiment of a suction tool according to the invention as a gutting tool with main and auxiliary air channel in a perspective view, FIG. 3 the suction tool according to FIG. 2 in a lateral view, FIG. 4 an enlarged illustration of the aperture area of the suction opening with auxiliary air channel, FIG. 5 a second embodiment of a suction tool according to the invention as a gutting tool with main and auxiliary air channel in a perspective view, FIG. 6 an enlarged illustration of the aperture area of the suction opening in a front view in transport direction T of the fish, FIG. 7 the aperture area according to FIG. 6 in a lateral view, FIG. 8 a variant of the arrangement of auxiliary air channel to main channel in the aperture area of the suction opening in a front view in direction T of the fish, and FIG. 9 a further variant of the arrangement of auxiliary air channel to main channel in the aperture area of the suction opening in a front view in direction T of the fish.

The suction tool illustrated in the drawing is used for removing and sucking the blood vessels out of a fish opened at the abdominal cavity. However, in the same manner the suction tool is also suitable for removing and sucking out other viscera of a fish opened at the abdominal cavity, e.g. for removing and sucking out intestinal remnants, skin, blood, etc. The suction tool can be used as a single module or as part of a processing station within an apparatus for gutting.

The drawing shows a suction tool 10 which is configured and adapted for gutting fish 11 opened at the abdominal cavity. The suction tool 10 comprises a suction pipe 13 forming a main channel 12, wherein the suction pipe 13 has a connection 14 for a vacuum unit 15 at a free end and a suction opening 16 at the opposing end facing the abdominal cavity in the operating state. The suction opening 16 laterally passes out of the suction pipe 13 and is thereby oriented radially in relation to the central axis M of the suction pipe 13.

For better understanding of the invention and of the arrangement and orientation of the suction tool 10 in the operating state, FIG. 1 shows an apparatus 17 which is configured and adapted for gutting fish 11 opened at the abdominal cavity. The apparatus 17 comprises a transport conveyor 18 with at least one receptacle 19 for receiving fish 11 lying on their backs and for transporting said fish tail-first in transport direction T. The apparatus 17 further comprises at least one suction tool 10 for sucking out the internal organs which is movable out of a standby position outside the abdominal cavity into a working position inside the abdominal cavity and back, at least one vacuum unit 15 to which the suction tool 10 is connected, at least one measuring device 21 which is configured in such a way as to detect specific fish data, and at least one control unit 22 for controlling the or each suction tool 10 dependent on the specific fish data detected by the measuring device 21.

Figure 5:
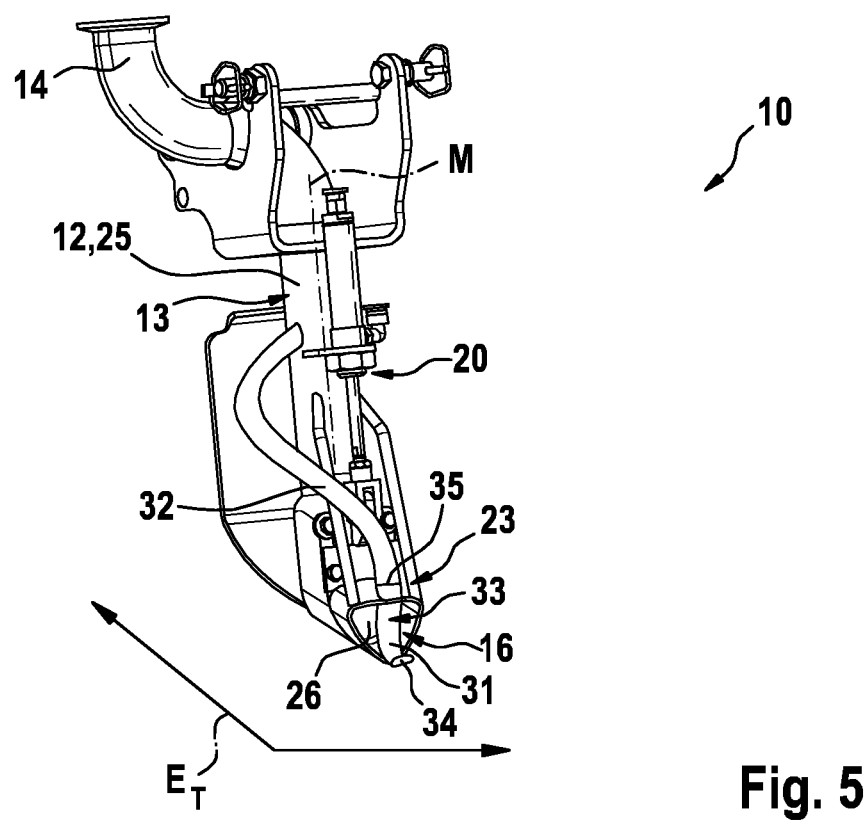
Figure 6:
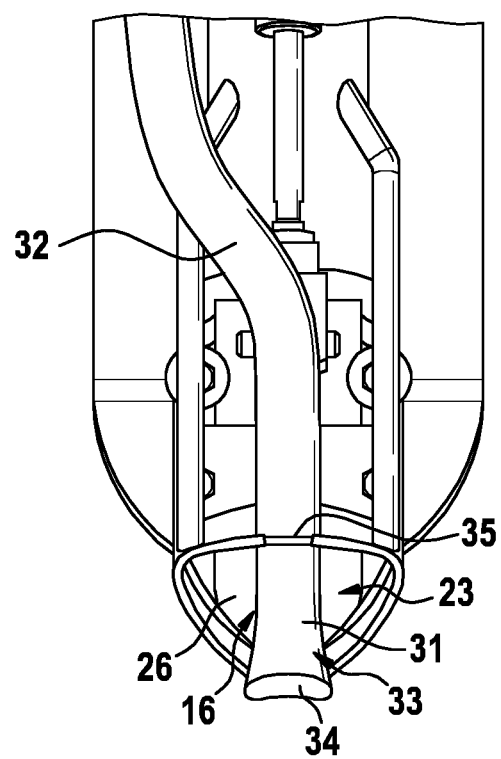
Figure 7:
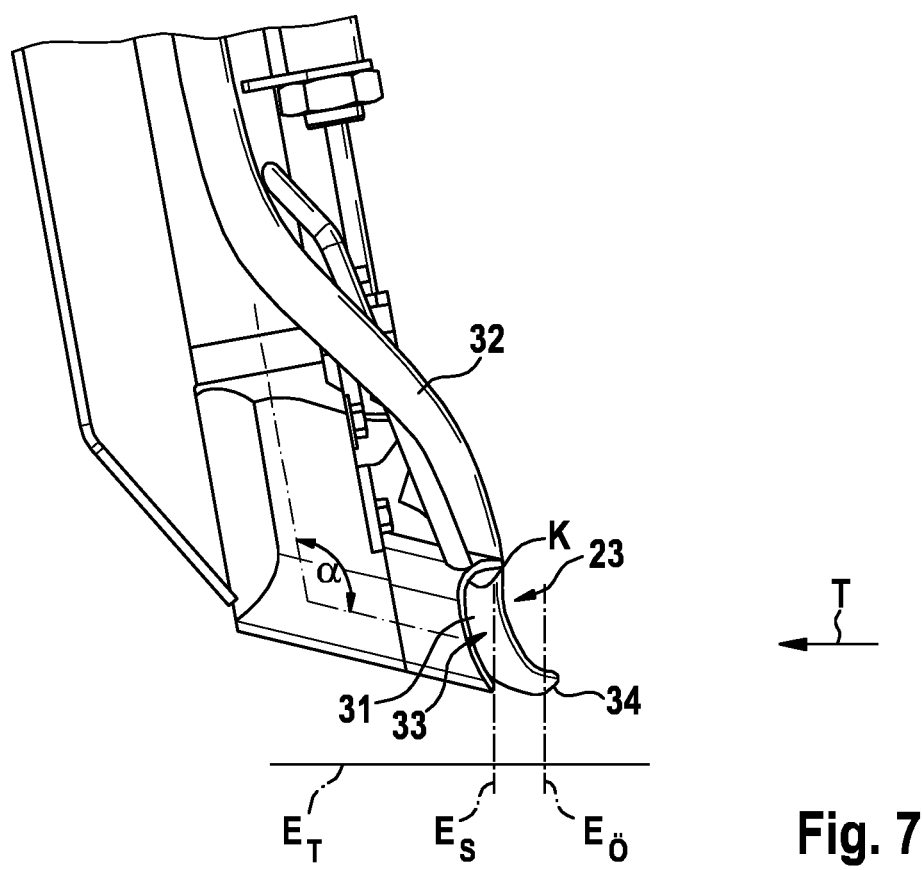
Figure 8:
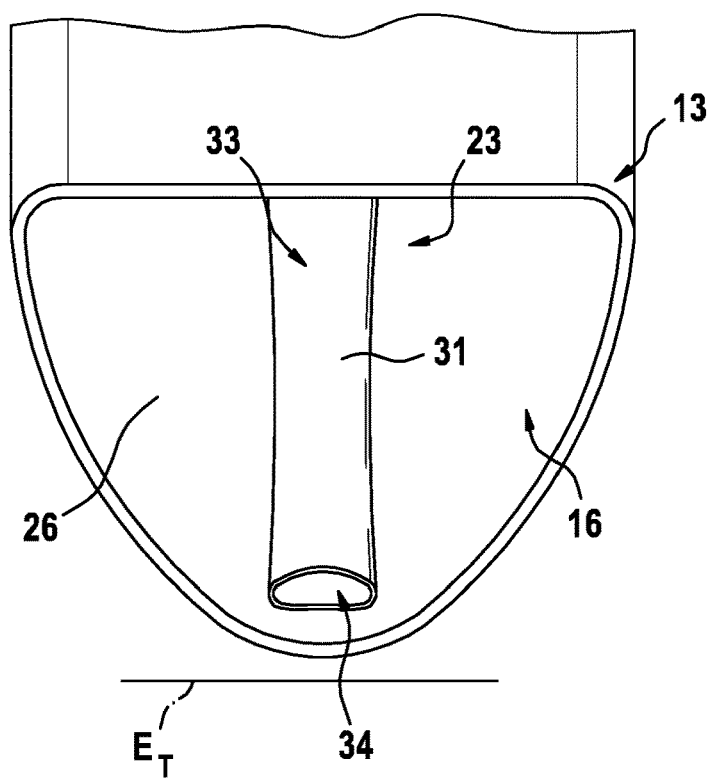
Figure 9:
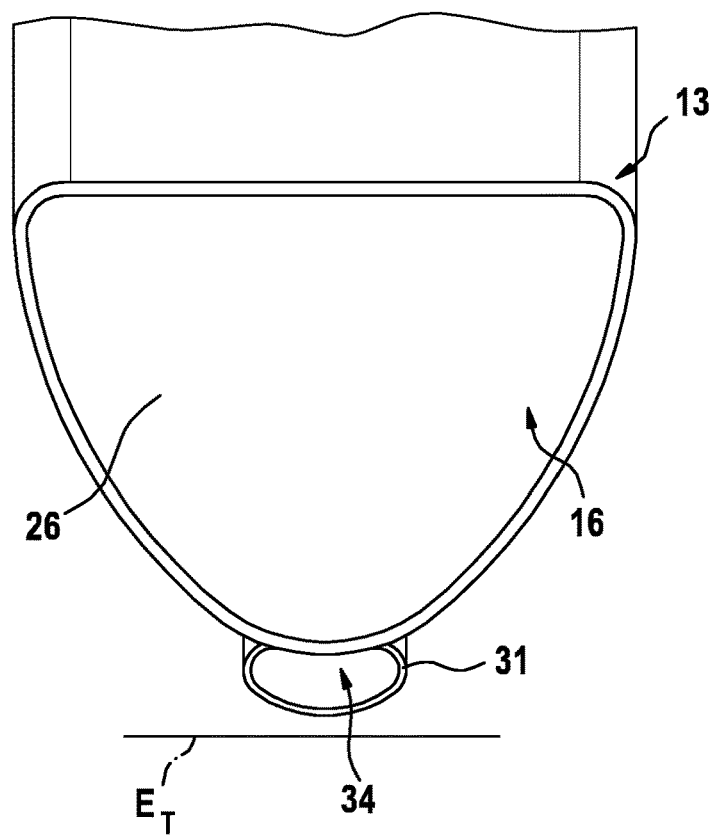

The suction tool 10 illustrated in the drawing (in particular in FIGS. 2 and 5) is characterised according to the invention in that an additional pipe element 23 for forming an auxiliary air channel 24 is arranged in the region of the suction opening 16 of the suction pipe 13, the pipe element 23 being arranged and configured in such a way that a continuous suction air volume flow is maintained in the operating state of the suction tool 10.

When taken on their own or in combination with each other, the features and developments described below illustrate preferred embodiments. It is expressly pointed out that features and process steps which are summarised in the claims and/or the description and/or the drawing or are described in a common embodiment can also further develop the suction tool 10 described above as well as the apparatus 17 described below and the method for gutting in a functionally independent manner.

The suction pipe 13 of the suction tool 10 preferably has a cylindrical hollow shaft 25, curved towards the free end, which dips into the abdominal cavity of the fish 11 to be processed. In other words, the hollow shaft 25 is bent at approximately 90° at the free end such that the suction opening 16 points contrary to the transport direction T of the fish 11. The angle of curvature a can also be greater than 90° (see FIG. 3 for example) or less than 90°. Thus in lateral view, e.g. according to FIG. 3, the suction tool 10 is almost L-shaped. The cross-section of the suction pipe 13 in the region of the curvature and in particular in the region of the suction opening 16 can be circular or of other shape. Especially preferred is a cross-sectional shape of the suction pipe 13 in the region of the suction opening 16 which is adapted to the inner shape of the fish 11 to be slaughtered. In the embodiments shown, an approximately triangular design of the cross-sectional shape of the suction opening 16 is preferred, the suction opening 16 pointing downwards with a "tip" S towards transport plane $E_T$ (see FIG. 2 for example) of the fish such that the suction opening 16 can be moved—as form-fittingly as possible—along the blood vessels along the base of the abdominal cavity. The aperture area 26 of the suction opening 16 or the plane $E_S$ defined/spanned by the suction opening 16 (as a notional plane) extends substantially perpendicular to the transport plane $E_T$ but can also be arranged inclined to the transport plane $E_T$. The outer edge K of the suction pipe 13 in the aperture area 26 of the suction opening 16 extends (as can be seen in particular in the lateral view according to FIG. 3) asymmetrically and curved to prevent flush contact of viscera and in particular of the head membrane on the suction opening 16.

One end of the pipe element 23 preferably lies in the operating area of the suction opening 16 of the main channel 12 of the suction pipe 13 and the other end of the pipe element 23 lies outside the operating area of the suction opening 16 of the main channel 12 of the suction pipe 13. Accordingly, the pipe element 23 is used to create a connection between the aperture area 26, in which a suction air volume flow is applied and through which the internal organs, viscera, blood, etc. flow, and a surrounding area 27 outside the suction pipe 13 which is kept free at least from the internal organs, viscera, blood, etc. In other words, the pipe element 23 creates an external access to the aperture area 26.

A closing mechanism 20 for closing the main channel 12 can be assigned to the suction pipe 13. The closing mechanism 20 preferably comprises at least one slide element for closing the suction opening 16 and a pneumatic cylinder for actuating said slide element. However, the closing mechanism 20 can also be implemented otherwise, for example by way of stepping motor-driven shutoff flaps, or the like.

Figure 2:
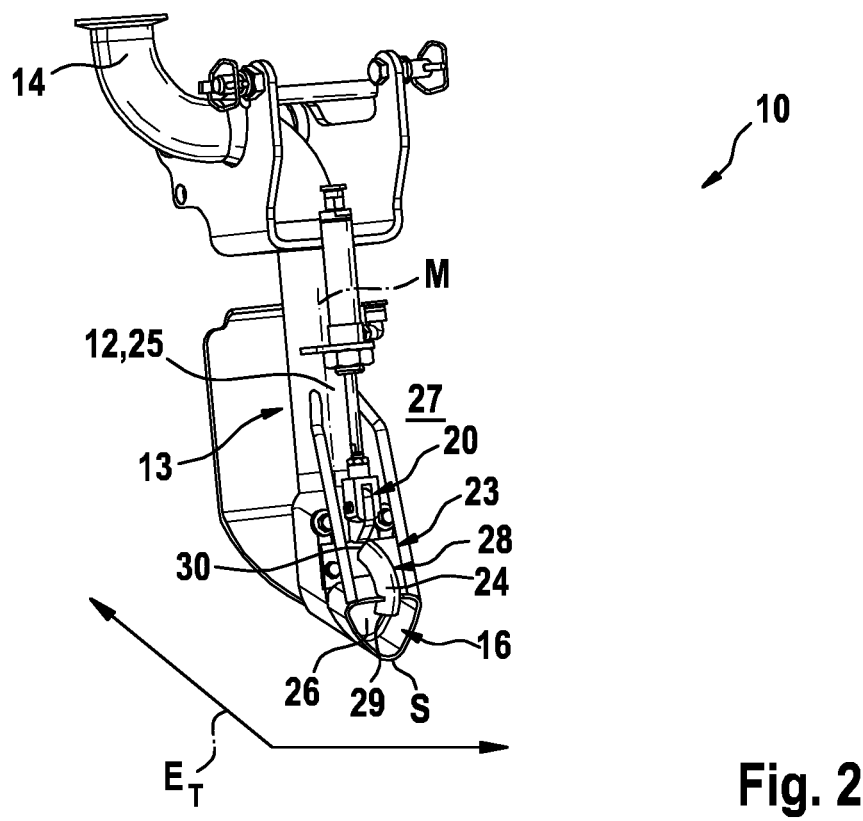
Figure 3:
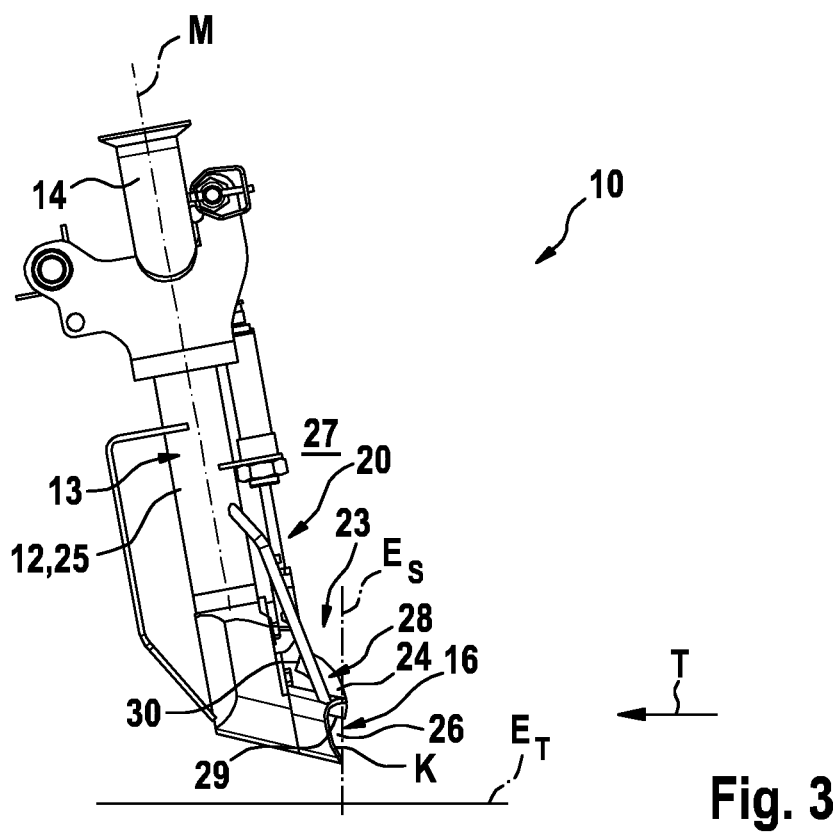
Figure 4:
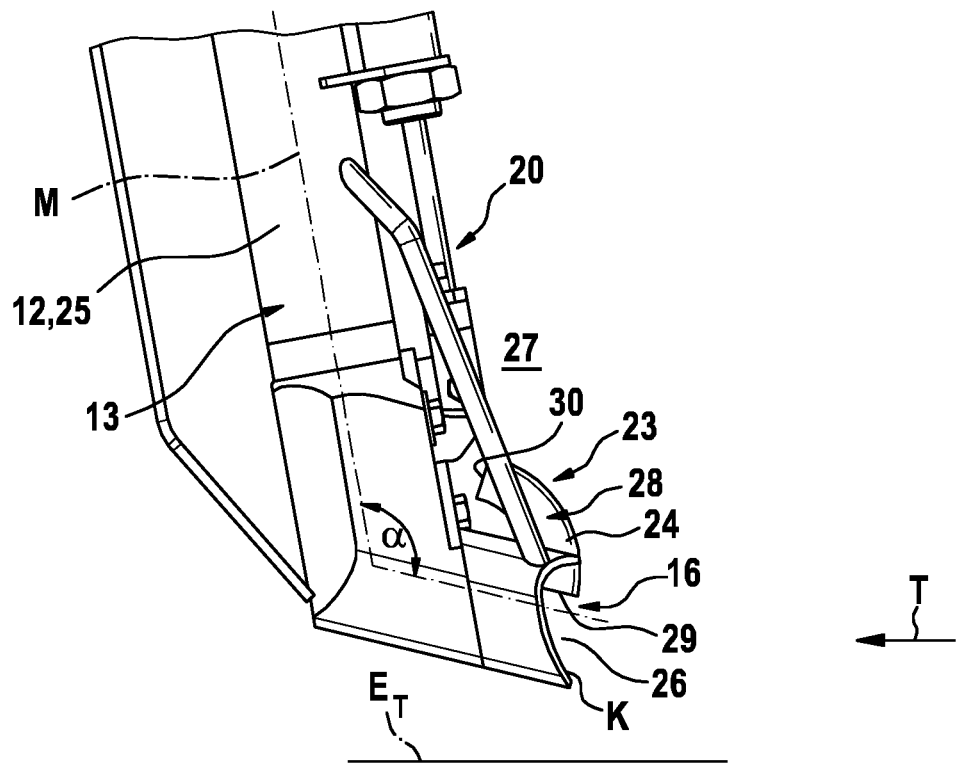

In the embodiment of the suction tool 10 according to FIGS. 2 to 4, the pipe element 23 is designed as a passive auxiliary air channel 24. The auxiliary air channel 24 connects the aperture area 26 of the suction opening 16 to the atmospheric environment (surrounding area 27) of the suction pipe 13 in the operating state. The pipe element 23 preferably comprises a curved pipe segment 28, whose one free end with an opening 29 is directed preferably vertically downwards, parallel (or in other embodiments substantially parallel or slightly inclined) to the central axis M of the suction pipe 13 and in the aperture area 26 of the suction opening 16 protrudes into the main channel 12, and whose other free end with an opening 30 protrudes from the main channel 12, said opening 30 being located outside the suction pipe 13 pointing in the opposite direction in relation to the suction opening 16. However, the shape and arrangement of the pipe segment 28 can also vary. This also relates to the shape of the openings 29, 30 themselves. The cross-section of the pipe segment 28 can also be circular, oval or otherwise. The cross-section of the pipe segment 28 can also vary along its length. However, it is preferably provided in all embodiments that the opening 29 located outside the suction pipe 13 in the surrounding area 27 is oriented in transport direction T of the fish in order to prevent the entry of internal organs, viscera, blood and the like. In the embodiment shown, the pipe segment 28 dips into the aperture area 26 of the suction opening from above in the operating state of the suction tool 10. The pipe segment 28 can also be guided into the aperture area 26 laterally or from below. The extent to which the pipe segment 28 dips into the aperture area 26 can also vary.

In the embodiment of the suction tool 10 according to FIGS. 5 to 9, the pipe element 23 is designed as an active auxiliary air channel 31. The active auxiliary air channel 31 connects the aperture area 26 of the suction opening 16 to a vacuum unit 15 in the operating state. This means that the pipe element 23 is connected via a suction tube 32 to the vacuum unit 15, which is in communication with the main channel 12, or to a dedicated, separate vacuum unit. In the event that two separate vacuum units are provided, the suction pipe 13 and the pipe element 23 can be operated together or separately from each other. In simple terms, the suction pipe 13 alone or the pipe element 23 alone or the suction pipe 13 in conjunction with the pipe element 23 can suck. The suction tube 32, starting from the pipe element 23, can also be guided directly into the main channel 12. The pipe element 23 comprises a pipe segment 33 whose one free end with an opening 34 in the aperture area 26 is oriented radially in relation to the central axis M of the suction pipe 13 corresponding to and in alignment with the suction opening 16 of the suction pipe 13, and whose other free end with an opening 35 can be connected by way of the suction tube 32 to a vacuum unit 15. The opening 34 of the pipe segment 33 located in the aperture area 26 points, like the suction opening 16, contrary to the transport direction T in the operating state. The suction opening 16 or the suction cross-section of the suction opening 16 is preferably several times larger compared to the opening 34 or the suction cross-section of the opening 34. The suction opening 16 thus forms a main cross-section while the opening 34 forms an auxiliary cross-section. The auxiliary cross-section can be located within the main cross-section (see FIG. 8 for example). In other embodiments, the auxiliary cross-section can also be located outside the main cross-section to enlarge the suction cross-section (see FIG. 9 for example). However, the shape and arrangement of the pipe segment 33 can also vary. This also relates in particular to the shape of the opening 34 itself. The cross-section of the pipe segment 33 can also be circular, oval or otherwise. The cross-section of the pipe segment 33 can also vary along its length.

Especially preferably, the pipe element 23 in the aperture area 26 protrudes from the suction pipe 13 with the free end. More precisely, the pipe element 23 is configured and adapted in such a way that the pipe segment 33 protrudes with the opening 34 beyond the suction opening 16 of the main channel 12 contrary to the transport direction T of the fish 11 to form the auxiliary air channel 31 (see FIG. 7 for example). The pipe segment 33 is arranged in transport direction T of the fish 11, that is in front of the suction pipe 13 (viewed in transport direction T, the plane $E_O$ defined by the opening 34 is located in front of the plane $E_S$ defined by the suction opening 16). The position in which the opening 34 of the pipe segment 33 is located in relation to the suction opening 16 of the suction pipe 13 depends substantially on the anatomy of the fish 11 to be processed. The opening 34 of the pipe element 23 located in the aperture area 26 of the suction pipe 13 is preferably arranged on the lower edge of the suction opening 16 of the suction pipe 13 in the operating state.

As mentioned, the suction tool 10 can be used as an individual module, particularly in conjunction with a vacuum unit 15. However, the suction tool 10 is preferably part of an apparatus 17 as has already been described above. The or each suction tool 10 of such an apparatus 17 is configured and adapted according to the invention in a manner described above. For this purpose, the apparatus 17 comprises at least one vacuum unit 15. Optionally, at least one further vacuum unit can be provided, in such a way that the suction pipe 13 is connected to a first vacuum unit 15 and the pipe element 23 to a second vacuum unit. In the embodiment illustrated according to FIG. 1, the processing station comprises three gutting tools 10, 40 and 50, wherein all said gutting tools 10, 40, 50 can be configured and adapted appropriately to the suction tool 10. Optionally, at least one further gutting tool 60 can also be provided. All gutting tools 10, 40, 50, 60 have drive devices, not shown, with the associated control/signalling ports 10', 40', 50', 60'.

The principle of the method according to the invention is explained in greater detail below based on the drawing:

The method according to the invention is used for gutting fish 11 opened at the abdominal cavity. For this purpose, the fish 11 are transported lying on their backs tail-first in transport direction T by way of a transport conveyor 18. Opening of the abdominal cavity can take place manually or automatically before the actual process and is preferably carried out by way of suitable cutting tools during transport of the fish 11 on the transport conveyor 18. Specific fish data are detected by way of a measuring device 21 during transport of the fish 11. At least one suction tool 10 dips into the opened abdominal cavity for sucking out the internal organs. The or each suction tool 10 is controlled to a defined position inside the abdominal cavity by way of a control unit 22 which is in operative connection with the measuring device 21 and the suction tool 10. A relative movement is then generated between the fish 11 and the suction tool 10. For this purpose, the suction tool 10 can be stationary and the fish 11 can be moved. Optionally, the fish 11 can also be stationary while the suction tool 10 is moved. Preferably, an overlapping movement of fish 11 and suction tool 10 takes place. The movement of the suction tool 10 can be guided linearly and/or can be pivoted in and opposite to the transport direction T. During the relative movement, the internal organs are sucked out and discharged through a main channel 12 of the suction tool 10 connected to a vacuum unit 15.

According to the invention, auxiliary air is provided to the main channel 12 by way of an auxiliary air channel 24, 31 when sucking out the internal organs, such that a continuous suction air volume flow is maintained. Accordingly, the suction air volume flow is not sucked in through the main channel 12 via the suction opening 16 alone but supportively also via the auxiliary air channel 24, 31. In other words, the auxiliary air channel 24, 31 provides a second source for supplying and therefore maintaining the suction air volume flow.

In one variant, the auxiliary air is provided to the main channel 12 passively as ambient air at atmospheric pressure via a pipe element 23 and the auxiliary air is sucked in through the main channel 12 in the aperture area 26 of the suction pipe 13. This means that, in addition to the suction opening 16, the aperture area 26 has another access (auxiliary air channel 24) to fresh air (ambient air at atmospheric pressure) through the pipe element 23, air being drawn via said access into the main channel 12 through the vacuum unit 15, the vacuum unit generating the suction air volume flow in the main channel 12, in order to further maintain the suction air volume flow particularly in the case of a suction opening 16 closed/blocked by internal organs, the head membrane or the like.

In a further variant, the auxiliary air is provided to the main channel 12 actively as suction air at negative pressure via a pipe element 23 so that a suction air volume flow is generated via the auxiliary air channel 31 in addition to the suction air volume flow via the main channel 12. Accordingly, there are two suction air volume flows which are generated by a single, common vacuum unit 15 or by separate vacuum units. The additional suction air volume flow allows the abdominal cavity to be cleaned more effectively. Even if the suction air volume flow through the main channel 12 is interrupted, cleaning of the abdominal cavity continues due to the suction air volume flow through the auxiliary air channel 31. Depending on the application, the abdominal cavity or parts thereof can be cleaned with the suction pipe 13 alone or with the pipe element 23 alone or with both the suction pipe 13 and the pipe element 23 together. Particularly for cleaning the area underneath the collar bone, it can be helpful to suction off blood, blood residues or the like using only the pipe element 23.

The invention claimed is:

1. A suction device configured and adapted for gutting fish whose abdominal cavity is open, said suction device comprising:
   a suction pipe having a main channel and one end being connectable to a vacuum source via a connector;
   a suction opening arranged on another end of the suction pipe and being configured to face the abdominal cavity during an operating state;

said suction opening being oriented in a radial direction relative to a central axis of the suction pipe;

a pipe having an air channel and being arranged in a region of the suction opening, wherein the pipe functions to maintain a continuous suction air volume flow during operation of the suction device.

2. The suction device of claim 1, wherein the pipe has one end located adjacent a mouth of the suction opening and a portion located outside the suction pipe.

3. The suction device of claim 1, wherein the pipe has one end located inside the suction opening and a portion located outside the suction pipe.

4. The suction device of claim 1, wherein the pipe has one end located outside the suction opening and a portion located outside the suction pipe.

5. The suction device of claim 1, further comprising a closing mechanism configured to close off the main channel of the suction pipe.

6. The suction device of claim 5, wherein the closing mechanism comprises at least one slide element for closing the suction opening and a pneumatic cylinder for actuating said at least one slide element.

7. The suction device of claim 1, further comprising a closing mechanism movable from a position wherein the main channel of the suction pipe is open to a closing position.

8. The suction device of claim 1, wherein the pipe functions as a passive auxiliary air channel, whereby, in an operating state, an aperture area of the suction opening is coupled to an atmospheric environment of the suction pipe.

9. The suction device of claim 1, wherein the pipe comprises a curved pipe portion having a downward facing opening whose central axis is parallel to the central axis of the suction pipe.

10. The suction device of claim 9, wherein one portion of curved pipe portion protrudes into the main channel.

11. The suction device of claim 10, wherein another portion of curved pipe portion has a central axis that is parallel to a central axis of the suction opening.

12. The suction device of claim 1, wherein the pipe is configured to couple an aperture area of the suction opening to the vacuum source.

13. The suction device of claim 1, wherein the pipe is configured to couple an aperture area of the suction opening to the suction pipe at a location downstream of the vacuum source.

14. The suction device of claim 1, wherein the pipe has one end located inside an aperture area of the suction opening, said one end being oriented radially in relation to the central axis of the suction pipe and being in alignment with the suction opening.

15. The suction device of claim 14, wherein the pipe has another end coupled to the vacuum source.

16. The suction device of claim 1, wherein the pipe has one end that protrudes out from the suction opening.

17. The suction device of claim 1, wherein the pipe has one end located adjacent a lower edge of the suction opening.

18. An apparatus configured and adapted for gutting fish whose abdominal cavity is open, comprising:

a transport conveyor transporting fish tail-first in transport direction T;

at least one receptacle for receiving fish lying on their backs;

at least one suction device according to claim 1 being configured to suck out internal organs of said fish;

said at least one suction device being movable from a standby position outside the abdominal cavity to a working position inside the abdominal cavity and back;

at least one vacuum source connected to the at least one suction device;

at least one measuring device configured to detect specific fish data; and at least one control configured to operate the apparatus.

19. The apparatus of claim 18, wherein the at least one vacuum source comprises at least first and second separate vacuum sources, wherein the first vacuum source is connected to the suction pipe and the second vacuum source is connected to the pipe.

20. A method of gutting fish whose abdominal cavity is open using the apparatus of claim 18, the method comprising:

transporting fish lying on their backs tail-first in transport direction T utilizing the transport conveyor;

detecting specific fish data utilizing the measuring device;

sucking out the internal organs into the opened abdominal cavity utilizing the suction device; and controlling movement of the suction device utilizing the control, wherein, during the sucking out of the internal organs, the internal organs pass through the main channel.

21. The method of claim 20, wherein, during operation of the apparatus, auxiliary air is provided to the main channel utilizing an auxiliary air channel of the pipe, whereby a continuous suction air volume flow is maintained in the main channel.

22. The method of claim 20, wherein, during operation of the apparatus, auxiliary air is provided to the main channel passively as ambient air at atmospheric pressure via the pipe, whereby the auxiliary air is sucked in through the main channel in an aperture area of the suction pipe.

23. The method of claim 20, wherein, during operation of the apparatus, auxiliary air is provided to the main channel actively as suction air at negative pressure via the pipe, whereby a suction air volume flow is generated via an auxiliary air channel of the pipe in addition to a suction air volume flow via the main channel.

* * * * *

UNITED STATES PATENT AND TRADEMARK OFFICE
CERTIFICATE OF CORRECTION

| | |
|---|---|
| PATENT NO. | : 10,609,934 B2 |
| APPLICATION NO. | : 16/096041 |
| DATED | : April 7, 2020 |
| INVENTOR(S) | : Rene Lukas Hensel et al. |

It is certified that error appears in the above-identified patent and that said Letters Patent is hereby corrected as shown below:

On the Title Page

Column 1, item (71) Applicant; and item (72) Inventors, which read:
"(71) Applicant: NORDISCHER MASCHINENBAU RUD. BAADER GMBH + CO. KG,
Luebeck (DE)

(72) Inventors: Rene Lukas HENSEL, Klempau (DE);
Carsten PAULSOHN, Luebeck (DE)"

Should read:
--(71) Applicant: NORDISCHER MASCHINENBAU RUD. BAADER GMBH + CO. KG,
Lübeck (DE)

(72) Inventors: Rene Lukas HENSEL, Klempau (DE);
Carsten PAULSOHN, Lübeck (DE)--

Signed and Sealed this
Twenty-fourth Day of November, 2020

Andrei Iancu
*Director of the United States Patent and Trademark Office*